United States Patent

[11] 3,542,109

[72] Inventor William Sylvester Stroh
    Dickson, Tennessee
[21] Appl. No. 740,533
[22] Filed June 27, 1968
[45] Patented Nov. 24, 1970
[73] Assignee Scovill Manufacturing Company
    Waterbury, Connecticut
    a corporation of Connecticut

[54] SNAP-IN TIRE VALVE
    5 Claims, 6 Drawing Figs.
[52] U.S. Cl. .................................................. 152/427
[51] Int. Cl. .................................................. B60c 29/00
[50] Field of Search .................................................. 152/427,
    430R

[56] References Cited
    UNITED STATES PATENTS
2,064,695  12/1936  Sipe .............................. 152/427X
2,225,472  12/1940  Franklin ....................... 152/427UX
2,862,539  12/1958  Williams ....................... 152/427

Primary Examiner—Arthur L. LaPoint
Attorney—Dallett Hoopes

ABSTRACT: A snap-in tire valve having inwardly deformable means above the peripheral bead to hold the bead against upward deformation. In the preferred embodiment, the means are elongate ribs molded into the valve body. In this way the valve can fit into any of a number of different-sized rim openings.

Patented Nov. 24, 1970 3,542,109

INVENTOR.
William S. Stroh
BY Dallett Hoopes
ATTORNEY.

SNAP-IN TIRE VALVE

This invention relates to a snap-in tire valve. More specifically, this invention relates to a snap-in tire valve adapted to fit various diameters of rim openings.

As is well known, it is the present practice of automobile and other wheel rim manufacturers to provide openings for a snap-in tire valve in the metal rim. These openings vary in size depending on the age of the vehicle wheel. For automobiles in this country, rim hole openings are presently one of two diameters, .453 inch or .625 inch, the latter made before 1955 and the former since that time. Also, rim holes vary depending on the type of vehicle: a wheelbarrow will have a smaller opening than a truck.

The provision of different size rim hole openings has accordingly required snap-in tire valves formed to accommodate the various diameters respectively. The after-market supplier has had to stock different diameter valves for each valve length and style. This has involved inventory complications which have resulted in sizeable investments and stocking problems.

To avoid the inventory problem, attempts have been made to provide a single valve adapted to be received into the different rim hole diameters. One such attempt is disclosed in the U.S. Pat. No. 2,968,333 wherein the periphery of the valve has a stepped structure including adjacent rim-engaging grooves of different diameters. In earlier structures, drawbacks have been inherent: because the different rim hole grooves are spaced at different distances from the fill end, the valve has extended out from the opening a different distance depending on the size opening of the rim. This has meant that in order to produce a uniform protrusion of the filler end through the hole in the wheel cover, for instance, a longer or shorter valve extension must be selected depending on the rim hole opening. Thus, inventory problems still result. Another disadvantage has been that when installed in the smaller opening, the base of the stepped valve has protruded so far into the rim as to interfere with tire mounting.

Under the present invention, a snap-in tire valve is provided with a rubber body having a single rim-engaging groove adapted to accommodate various rim hole openings. This is made possible by providing the bead above the groove with means supporting it against upward deformation, which means are themselves deformable inwardly during installation.

Further features of the invention will be clear upon reading the following specification including the drawings wherein.

Figure 1:
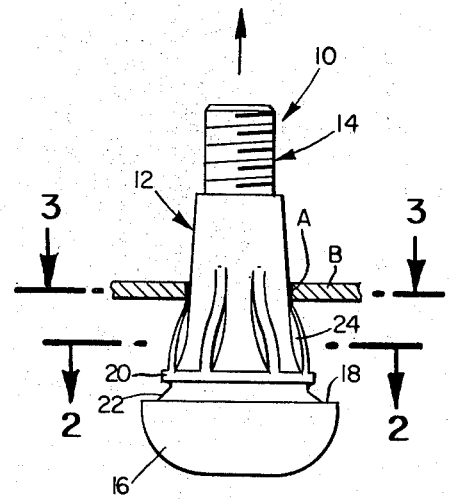
FIG. 1 is side elevational view of a snap-in valve embodying the invention shown in the process of being drawn through a rim hole opening.
Figure 2:
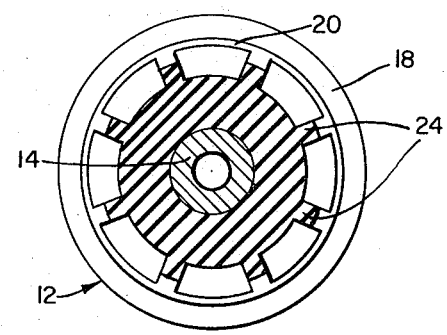
FIG. 2 is an enlarged sectional view in the plane of line 2-2 of FIG. 1 and looking in the direction of the arrows.

Referring more specifically to the drawings, a snap-in tire valve embodying the invention is shown in FIG. 1 and generally designated 10. It comprises a rubber body 12 and the conventional rigid insert 14 which protrudes above the body to expose a threaded fill nipple. The lower end of the body is formed as a bulbous inverted dome-shaped base 16. Above the base the body presents an upwardly facing shoulder 18. Spaced above the shoulder is a peripheral bead 20, the bead and the shoulder defining between them a peripheral rim-engaging channel 22. The channel may be in width substantially the same as the thickness of the metal wheel rim. As shown, the channel is relatively deep adjacent the bead 20, and gradually becomes shallower as the shoulder 18 is approached.

Above the bead 20, the body 12 tapers inward rather abruptly. The body is formed in this region with spaced longitudinal ribs 24. These ribs as shown extend almost directly upwardly from the bead 20 then taper inwardly to blend into the body. The ribs 24 afford a support means against the upward deformation of the bead to hold the valve, once installed, against movement into the tire chamber.

Figure 3:
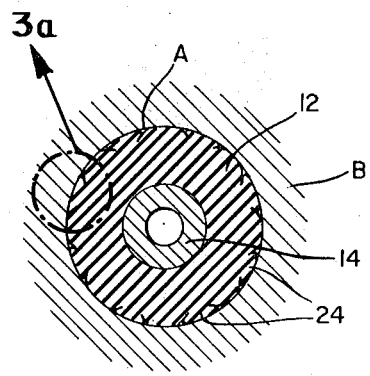
FIG. 3 is an enlarged sectional view taken on the line 3-3 of FIG. 1 showing the body of the valve being collapsed during installation.

As shown in FIG. 3, as the valve in installation is drawn through the opening A in the rim B, the ribs, being made of rubber, are deformed inwardly to permit passage of the rim. The accommodation of the ribs in this respect is sufficient in the preferred embodiment to permit even the smaller rim hole opening to pass. The bead 20 deforms and compresses inwardly to permit the passage of the rim into the channel 22. The compression of the bead is facilitated by providing, as is conventional and in accordance with U.S. Pat. No. 2,966,191, an annular space 26 (FIG. 4) between the rubber bonded to the insert and the body outward therefrom.

Figure 4:
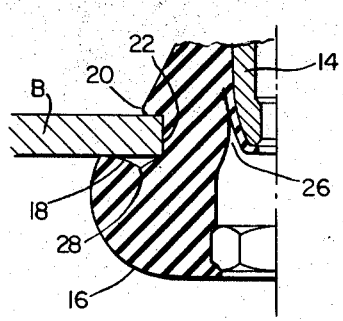
FIG. 4 is an enlarged fragmentary sectional view showing the disposition of the rim-engaging groove with a snap-in tire valve of a lesser diameter.

FIG. 4 shows the valve in engagement with the rim in an opening of lesser diameter. The rim tightly engages the narrowest part of the groove 22 and the bead 20 thereabove holds the valve against displacement into the rim. The juncture of the shoulder 18 and the sloping wall of the channel 22 can be seen at 28.

Figure 5:
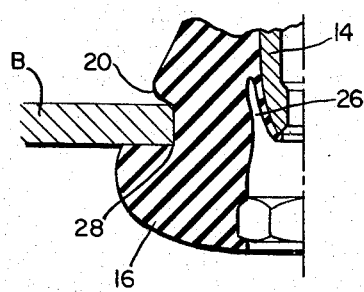
FIG. 5 is a sectional view showing the disposition of the rim-engaging groove with a snap-in tire valve of a greater diameter.
Figure 3A:
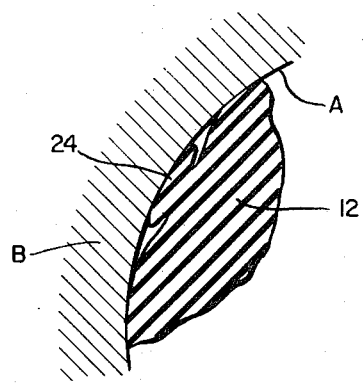
FIG. 3a is a greatly enlarged fragmentary view of a portion of FIG. 3.

FIG. 5 shows the valve engaging about the rim having a larger opening. In this view, the juncture 28 is at the bottom edge of the opening and rubber in this area is compressed severely inwardly, the bead 20 being positioned above the rim again to prevent displacement.

From the above it can be seen that the valve of the invention readily accommodates the various diameters of the rim openings. In the version shown, the ribs being readily deformable facilitate the entry of the valve into the rim holes. The shaping of the channel assures a seal in either size. As a result of the invention, there is no longer need to inventory valves having different size channels. At the same time, the protrusion of the valve internally and externally from the opening is uniform irrespective of the size of the opening.

While the invention has been shown in but one embodiment, it will be clear to those skilled in the art that it is not so limited but is susceptible of many variations. Accordingly, the invention may be described by the appended claim language.

I claim:

1. A snap-in tire valve comprising a tubular metal insert and a resilient body disposed about and bonded to the insert, the body being formed with an upwardly facing outward annular shoulder spaced above the lower end, the body having an uninterrupted peripheral bead spaced up from the shoulder and spaced narrow longitudinal ribs extending upward from the bead and tapering inward toward the body, the bead and the shoulder defining between them a peripheral rim-engaging channel, the channel being in width substantially the same dimension as the thickness of a wheel rim, the longitudinal ribs comprising in aggregate less than half the circumferential distance about the body affording substantial support to said bead against upward deformation and yet being deformable inwardly of the body to permit the passage of the rim as the valve is drawn through a rim hole.

2. A tire valve as described in claim 1 wherein the channel tapers to a minimum diameter adjacent the bead from a maximum diameter adjacent the shoulder.

3. A tire valve as described in claim 1 wherein the insert extends downward to the level of the channel and an annular cavity in the body surrounds the insert at that level to make the body more compressible in the area of the bead and channel.

4. A snap-in tire valve comprising a tubular rigid insert and a resilient body surrounding and bonded to the insert, the body having an upwardly facing annular shoulder and a peripheral bead thereabove, the bead and the shoulder defining between them an annular rim-engaging channel, support means extending outward from the body above the bead and contiguous with the bead for holding the bead against upward deformation, the support means being adapted to deform inwardly to permit passage of the rim as the valve is drawn through the rim hole, the rim-engaging channel tapering to a minimum diameter adjacent the bead from a maximum diameter adjacent the shoulder.

5. A valve as described in claim 4 wherein the support means is molded into the body and comprises a plurality of spaced outward longitudinal ribs extending upward form the bead.